(12) United States Patent
Wietkamp et al.

(10) Patent No.: US 11,927,045 B2
(45) Date of Patent: Mar. 12, 2024

(54) FUEL FILLER FLAP MODULE OF A MOTOR VEHICLE

(71) Applicant: Huf Huelsbeck & Fuerst GmbH & Co. KG, Velbert (DE)

(72) Inventors: Stephan Wietkamp, Muenster (DE); Andreas Koch, Heiligenhaus (DE)

(73) Assignee: HUF HUELSBECK & FUERST GMBH & CO. KG, Velbert (DE)

( * ) Notice: Subject to any disclaimer, the term of this patent is extended or adjusted under 35 U.S.C. 154(b) by 571 days.

(21) Appl. No.: 17/252,885

(22) PCT Filed: May 28, 2020

(86) PCT No.: PCT/EP2020/064795
§ 371 (c)(1),
(2) Date: Dec. 16, 2020

(87) PCT Pub. No.: WO2021/023408
PCT Pub. Date: Feb. 11, 2021

(65) Prior Publication Data
US 2022/0186542 A1    Jun. 16, 2022

(30) Foreign Application Priority Data
Aug. 8, 2019 (DE) .............. 10 2019 121 457.2

(51) Int. Cl.
*E05F 15/00* (2015.01)
*B60K 15/05* (2006.01)
*E05F 15/627* (2015.01)

(52) U.S. Cl.
CPC ............ *E05F 15/627* (2015.01); *B60K 15/05* (2013.01); *B60K 2015/053* (2013.01);
(Continued)

(58) Field of Classification Search
CPC .... E05F 15/00; E05F 15/627; E05Y 2201/43; E05Y 2201/434; E05Y 2201/484;
(Continued)

(56) References Cited

U.S. PATENT DOCUMENTS 7,758,098 B2    7/2010  Busch
8,677,690 B2 *  3/2014  Lee ................... E05B 83/34
                                                    49/324
(Continued)

FOREIGN PATENT DOCUMENTS

DE    20 2017 009 616 A1    5/2018
EP            1 281 558 A2    2/2003
GB               2528773 A    2/2016

OTHER PUBLICATIONS

Written Opinion of International Application No. PCT/EP2020/064795, 5 pages.
(Continued)

*Primary Examiner* — Chi Q Nguyen
(74) *Attorney, Agent, or Firm* — Lippes Mathias LLP (57) ABSTRACT

A fuel filler flap module of a motor vehicle includes a carrier, a fuel filler flap which is pivotably mounted on the carrier and is designed to be movable between a closed position and an open position, and a movement mechanism designed to move the fuel filler flap from the closed position into the open position and back into the closed position. The movement mechanism has a mechanical deployment element which is arranged on the carrier and which is designed to exert a deployment force acting into the open position on the fuel filler flap, wherein the movement mechanism has a motor-driven deployment means which is designed to push the fuel filler flap with an auxiliary force from the closed position up to an initial deployment position, which lies
(Continued)

between the closed position and the open position, wherein the auxiliary force is greater than the deployment force.

10 Claims, 4 Drawing Sheets

(52) U.S. Cl.
CPC ... *E05Y 2201/434* (2013.01); *E05Y 2201/484* (2013.01); *E05Y 2201/654* (2013.01); *E05Y 2201/668* (2013.01); *E05Y 2201/706* (2013.01); *E05Y 2900/534* (2013.01)

(58) Field of Classification Search
CPC ......... E05Y 2201/644; E05Y 2201/654; E05Y 2201/668; E05Y 2201/706; E05Y 2900/534; E05Y 2900/538; B60K 15/05; B60K 2015/0507; B60K 2015/0515; B60K 2015/053; B60K 2015/0538
See application file for complete search history.

(56) References Cited

U.S. PATENT DOCUMENTS

| | | | | |
|---|---|---|---|---|
| 8,870,241 | B2 * | 10/2014 | Lee | E05B 83/34 |
| | | | | 292/144 |
| 10,384,534 | B2 * | 8/2019 | Guardianelli | B60K 15/05 |
| 11,673,466 | B2 * | 6/2023 | Sha | E05B 81/36 |
| | | | | 49/281 |
| 2008/0135552 | A1 * | 6/2008 | Baudoux | B60K 15/05 |
| | | | | 220/203.01 |
| 2008/0230147 | A1 * | 9/2008 | Baudoux | B60K 15/04 |
| | | | | 141/349 |
| 2011/0306223 | A1 * | 12/2011 | Bauer | H01R 13/6397 |
| | | | | 439/136 |
| 2015/0375630 | A1 * | 12/2015 | Jeong | B60L 53/16 |
| | | | | 49/386 |
| 2017/0182882 | A1 | 6/2017 | Persiani et al. | |
| 2022/0136292 | A1 * | 5/2022 | Sun | B60K 15/05 |
| | | | | 49/280 |
| 2022/0199079 | A1 * | 6/2022 | Hanson | H04L 51/02 |
| 2023/0097685 | A1 * | 3/2023 | Herzig | B60L 53/16 |
| | | | | 296/97.22 |
| 2023/0129663 | A1 * | 4/2023 | Kim | H05B 3/22 |
| | | | | 49/70 |
| 2023/0151651 | A1 * | 5/2023 | Hegwein | E05B 47/0001 |
| | | | | 296/97.22 |

OTHER PUBLICATIONS

International Search Report of International Application No. PCT/EP2020/064795 dated Oct. 14, 2020, 5 pages.
International Preliminary Report on Patentability of International Application No. PCT/EP2020/064795 dated Feb. 8, 2022 (English Translation) 8 pages.

* cited by examiner

FUEL FILLER FLAP MODULE OF A MOTOR VEHICLE

BACKGROUND

The invention relates to a fuel filler flap module of a motor vehicle, comprising a carrier, a fuel filler flap, which is pivotably mounted on the carrier and is designed to be movable between a closed position and an open position, and a movement mechanism designed to move the fuel filler flap from the closed position into the open position and back into the closed position.

Such a fuel filler flap module is disclosed, for example, in DE 10 2017 009 616 A1 and has a fuel filler recess and a fuel filler flap having a hinge arm articulated on the fuel filler recess, the fuel filler flap being pivotable by the hinge arm from a closed position, in which the fuel filler recess is at least partly closed, into an open position, in which the fuel filler recess is accessible from the outside for refueling the motor vehicle. However, if, for example, the fuel filler flap is held in its retracted position due to the formation of ice, the force of a motor-driven movement mechanism provided for pivoting the fuel filler flap into an open position for deploying the fuel filler flap is usually not sufficient to break the fuel filler flap loose and move it into its open position, so that initially a possibility of de-icing must be provided in order to be able to move the fuel filler flap.

The invention is based on the object of creating a solution that provides a fuel filler flap module of a motor vehicle in a structurally simple manner, by means of which a blockage of the movement of the fuel filler flap or a resistance to the movement of the fuel filler flap can be overcome at the beginning of its deployment process.

BRIEF SUMMARY

In the case of a fuel filler flap module of the type specified at the outset, the object is achieved according to the invention in that the movement mechanism has a mechanical deployment element which is arranged on the carrier and which is designed to exert a deployment force acting in the open position on the fuel filler flap, wherein the movement mechanism has a motor-driven deployment means which is designed to push the fuel filler flap with an auxiliary force from the closed position up to an initial deployment position, which lies between the closed position and the open position, wherein the auxiliary force is greater than the deployment force.

Advantageous and expedient embodiments and developments of the invention are disclosed in the dependent claims.

It should be noted that the term "refueling" in the scope of the invention is to be understood as refueling a motor vehicle with traditional fuel or hydrogen and charging a battery of a motor vehicle, i.e. a so-called electric vehicle, the fuel filler flap of the fuel filler flap module according to the invention covering either a fuel filler neck, which is connected to a fuel tank and closed by a fuel filler cap, or a charging socket for a charging plug.

The invention provides a fuel filler flap module of a motor vehicle which is characterized by a simple construction and a special concept with regard to overcoming a blockage or a resistance during the movement of the fuel filler flap at the beginning of the deployment process. According to the invention, the mechanical deployment element ensures that the fuel filler flap is pushed from the closed position into the open position in normal operation without a blockage, so that a user has the option of accessing a fuel filler neck or a charging socket. In the event that the deployment movement of the fuel filler flap is blocked, as can be the case, for example, in the case of the formation of ice due to the fuel filler flap freezing in its closed position, the motor-driven deployment means ensures that the initial movement for the deployment of the fuel filler flap is ensured, even in the case of a blockage due to, for example, freezing, because the auxiliary force applied by the motor-driven deployment means is greater than the deployment force of the mechanical deployment element and is sufficient to release the blocking. In normal operation, the auxiliary force of the motor-driven deployment means does not work because the fuel filler flap "flees" from the closed position in the direction of the open position in front of the motor-driven deployment means by the deployment force of the mechanical deployment element, so that the motor-driven deployment means cannot even push against the fuel filler flap to move it out of the closed position.

The invention provides in an embodiment that the fuel filler flap is mounted pivotably about a pivot axis mounted on the carrier, the initial deployment position being a position moved out of the closed position in the direction of the open position, in which the fuel filler flap is arranged pivoted by 2° to 10° about the pivot axis in the direction of the open position with respect to the closed position. The mechanically driven deployment means acts preferably only up to a pivoting angle of 4° on the fuel filler flap in order to move it out of the closed position, which is a completely sufficient pivoting angle to ensure that the fuel filler flap is free and movable.

It is structurally particularly favorable in an embodiment of the invention if the mechanical deployment element is a torsion spring wound around the pivot axis, from which a first spring arm is supported on the fuel filler flap and from which a second spring arm is supported on the carrier. The use of a torsion spring as a mechanical deployment element is not only an inexpensive option in terms of costs. Rather, the maintenance intensity of the fuel filler flap module is significantly reduced as a result.

With regard to a small installation space, the invention provides in a further embodiment that the motor-driven deployment means has an output shaft driven by an actuator attached to the carrier, which output shaft is mounted on the carrier at a distance from the pivot axis and on which an eccentric contour is integrally formed, which eccentric contour interacts with the fuel filler flap from the closed position to the initial deployment position when the deployment force of the mechanical deployment element does not push the fuel filler flap from the closed position into the initial deployment position.

The invention provides in an embodiment that the eccentric contour is designed having a radius which increases with respect to the output shaft and which, during the rotation of the output shaft, is designed to abut on a pivoting arm of the fuel filler flap and to push against the pivoting arm and thereby to push the fuel filler flap into the initial deployment position. In a blockage operation of the fuel filler flap module, the eccentric contour pushes the pivoting arm up to the initial deployment position if the fuel filler flap has not already been released from a blockage and "flees" from the motorized deployment means.

To ensure the decoupling of the motor-driven deployment means from the fuel filler flap, the invention provides in a further embodiment that the eccentric contour is arranged at a distance from the pivoting arm of the fuel filler flap from the initial deployment position up to the open position.

In yet another embodiment of the invention, it is provided that a disc element is formed on the output shaft and a cable means is provided, which is fixed with a first end to the disc element and of which a second end is fastened to the fuel filler flap. Thus, the movement of the output shaft ensures that the cable means wound on the disc element ensures a time-controlled deploying of the fuel filler flap, in that the cable means moves the fuel filler flap in a controlled manner against the deployment force of the mechanical deployment element into the open position and from the open position back into the closed position. Accordingly, it is provided in an embodiment of the invention that the cable means is connected to the fuel filler flap in such a way that the cable means is designed to guide the movement of the fuel filler flap during the movement of the fuel filler flap from the initial deployment position into the open position against the deployment force of the mechanical deployment element.

For this purpose, it is provided in an advantageous embodiment of the invention that the disc element has a winding contour designed for rolling up and unrolling the cable means.

Finally, in an embodiment, the invention provides that the winding contour is designed having at least two different radii continuously merging into one another or is designed to be eccentric. This asymmetrical shape of the winding contour allows, due to different radii, for example, during the movement of the fuel filler flap into the closed position, on the last movement path, that the cable means is pulled with a higher force in order to pull the fuel filler flap sealingly into an existing seal.

It goes without saying that the features mentioned above and those to be explained below can be used not only in the combination indicated but also in other combinations or alone, without departing from the scope of this invention. The scope of the invention is defined only by the claims.

BRIEF DESCRIPTION OF THE DRAWINGS

Other details, features, and advantages of the subject matter of the invention can be found in the following description in connection with the drawing, in which an exemplary and preferred embodiment of the invention is shown.

In the drawing.

DETAILED DESCRIPTION

Figure 1:
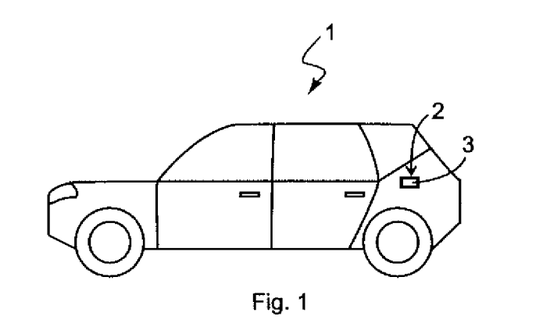
FIG. 1 is a schematic side view of a motor vehicle having a fuel filler flap module according to the invention.
Figure 2:
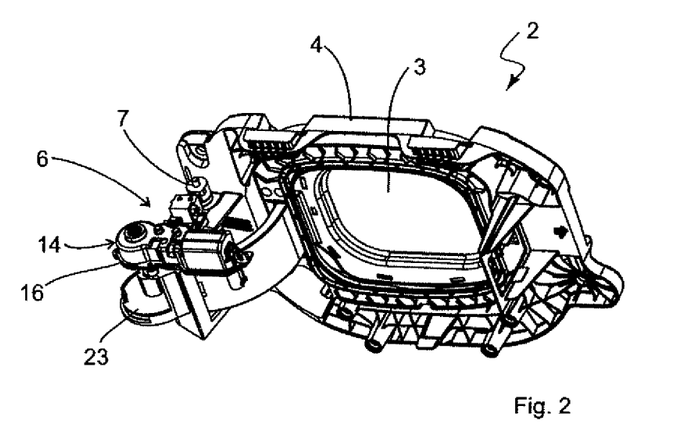
FIG. 2 is a perspective view of the fuel filler flap module according to the invention having a fuel filler flap which is arranged in a closed position.
Figure 3:
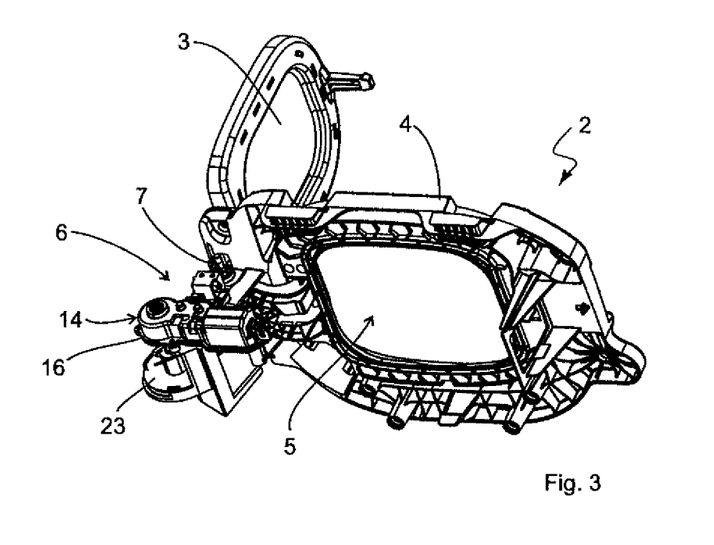
FIG. 3 is a perspective view of the fuel filler flap module according to the invention having the fuel filler flap which is arranged in an open position.
Figure 4:
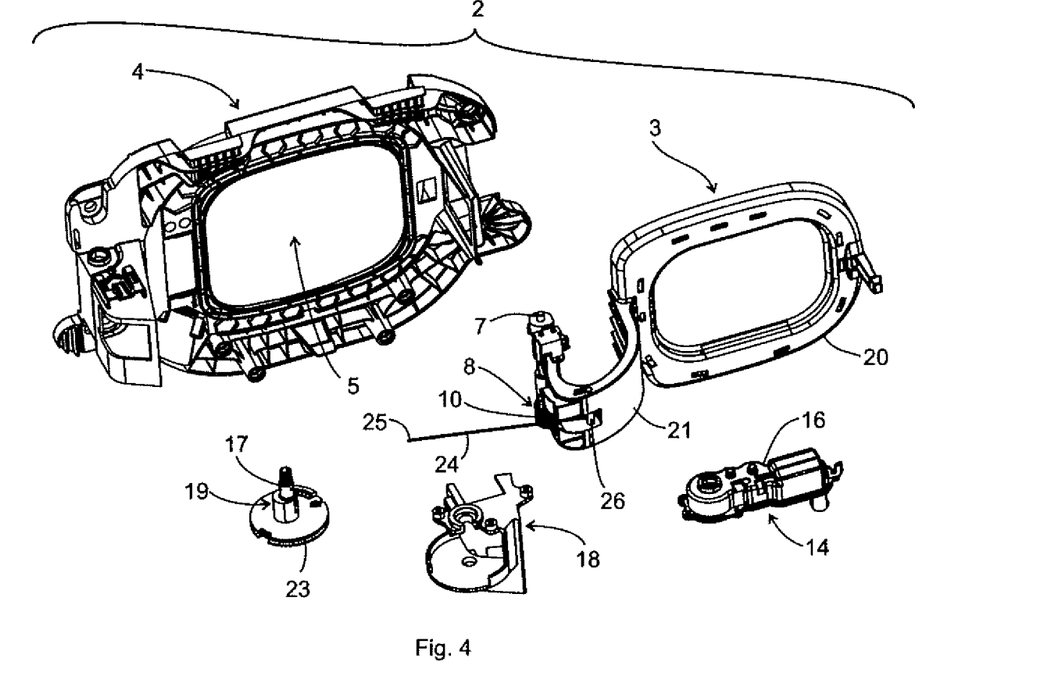
FIG. 4 is a perspective view of individual parts of the fuel filler flap module according to the invention.
Figure 5:
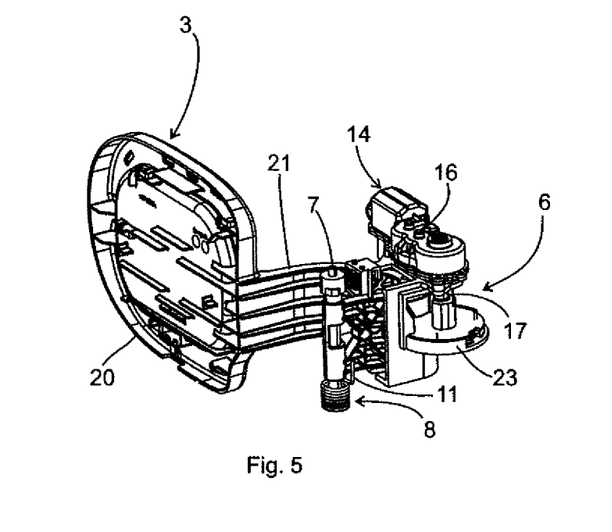
FIG. 5 is a perspective view of the fuel filler flap and a movement mechanism of the fuel filler flap module according to the invention.
Figure 6:
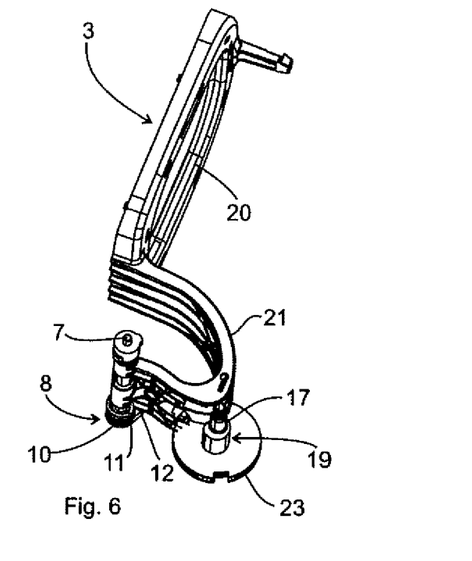
FIG. 6 is a further perspective view of individual components of the fuel filler flap module according to the invention.

FIG. 1 shows a motor vehicle 1 in the form of a car by way of example, which in the example has a fuel filler flap module 2 which has a fuel filler flap 3. The fuel filler flap 3 closes a recess (not shown in detail in the drawings) in which either a fuel filler neck which is connected to a fuel tank and is closed by a fuel filler cap or a charging socket for a charging plug is arranged. The fuel filler flap module 2 according to the invention also has a carrier 4 which can be fastened to a body component of the motor vehicle 1. The fuel filler flap 3 is pivotably mounted on the carrier 4, which can be seen from FIGS. 2 and 3, for example, so that the fuel filler flap 3 is designed to be movable between a closed position shown in FIG. 2, in which the fuel filler flap 3 covers the recess and, if necessary, closes it, and an open position shown in FIG. 3, in which a user has access through a through opening 5 formed in the carrier 4 to the interior of the recess. Consequently, in its closed position, the fuel filler flap 3 closes the through opening 5 designed in the carrier 4, whereas in its open position the fuel filler flap 3 is arranged lifted from the through opening 5 and releases a passage through the through opening 5. Furthermore, the fuel filler flap module 2 according to the invention has a movement mechanism 6 (see, for example, FIGS. 2 and 3) which is designed to move the fuel filler flap 3 from the closed position into the open position and back into the closed position. During the movement of the fuel filler flap 2 from the closed position into the open position, the fuel filler flap 2 passes through an initial deployment position between the closed position and the open position.

Looking at FIGS. 2 to 11 together, it can be seen that the fuel filler flap 3 is mounted pivotably about a pivot axis 7, the pivot axis 7 itself being mounted on the carrier 4. In order to move the fuel filler flap 3 from the closed position into the open position in normal operation, the movement mechanism 6 has a mechanical deployment element 8, which can be seen from FIG. 5, for example. The mechanical deployment element 8 is arranged on the carrier 4, the mechanical deployment element 8 also being designed to exert a deployment force 9 (see, for example, FIG. 11) acting in the open position on the fuel filler flap 3. For this purpose, the mechanical deployment element 8 is designed as a torsion spring 10 which is wound around the pivot axis 7. A first spring arm 11 of the torsion spring 10 is supported on the fuel filler flap 3, whereas a second spring arm 12 of the torsion spring 10 is supported on the carrier 4. In the closed position of the fuel filler flap 4, the torsion spring 10 is consequently tensioned and exerts the deployment force 9, which acts on the fuel filler flap 3 and pushes it in the direction of the open position thereof. The movement mechanism 6 also has a motor-driven deployment means 14, which is shown, for example, in FIGS. 2 to 5. The motor-driven deployment means 14 is designed in such a way that an auxiliary force 15 (see, for example, FIG. 11) pushes the fuel filler flap 3 out of the closed position into the initial deployment position, which lies between the closed position and the open position, when a blockage condition exists in which the deployment force 9 of the mechanical deployment element 8 is not sufficient to move the fuel filler flap 3 out of the closed position. The auxiliary force 15 of the motor-driven deployment means 14 is greater than the deployment force 9 of the mechanical deployment element 8. The motor-driven deployment means 14 is an actuator 16 which is drive-connected to an output shaft 17 and which drives the output shaft 17 in rotation, the actuator 16 being fastened to the carrier 4. The output shaft 17 is mounted on the carrier 4 at a distance from the pivot axis 7. In the embodiment shown in the drawings, a holder 18 is provided for this purpose, with which the movement mechanism 6 is fixed as an assembly on the carrier 4.

So that the motor-driven deployment means 14 can force the fuel filler flap 3 out of the closed position, an eccentric contour 19 is formed on the output shaft 17. This eccentric contour 19 interacts with the fuel filler flap 3, this interaction referring to the region from the closed position to the initial deployment position, and the interaction only existing when the deployment force 9 of the mechanical deployment element 8 does not push the fuel filler flap 3 from the closed position past the initial deployment position, which is the case with a blockage operation. The fuel filler flap 3 comprises a flap body 20, which is adapted to the through opening 5 and can cover or close the through opening 5, and a pivoting arm 21 designed in a U-shape, the free end of which is inserted over the pivot axis 7 and is thus rotatably mounted.

In a blockage operation, the motor-driven deployment means 14 pushes with the output shaft 17 against the pivoting arm 21, for this purpose the eccentric contour 19 is formed on the output shaft 17, which eccentric contour interacts with the fuel filler flap 3 from the closed position to the initial deployment position when the deployment force 9 of the mechanical deployment element 8 does not push the fuel filler flap 3 from the closed position into the initial deployment position. The initial deployment position is a position moved out of the closed position in the direction of the open position, in which the fuel filler flap 3 is arranged pivoted about the pivot axis 7 in the direction of the open position with respect to the closed position. The pivoting angle can be in a range between 2° and 10°. As can be seen, for example, from FIGS. 8, 10 and 11, the eccentric contour 19 is designed having a radius 22 which increases with respect to the output shaft 17 and which, during the rotation of the output shaft 17, is designed to abut on the pivoting arm 21 of the fuel filler flap 3 and to push against the pivoting arm 21 and thereby to push the fuel filler flap 3 into the initial deployment position. It should again be pointed out that the eccentric contour 19 only serves to move the fuel filler flap 3 by means of the auxiliary force to the initial deployment position in a blockage operation, from which initial deployment position the mechanical deployment element 8 then pushes the fuel filler flap 3 by means of the deployment force 9 to the open position and the eccentric contour 19 no longer exerts an effect on the fuel filler flap 3.

Figure 7:
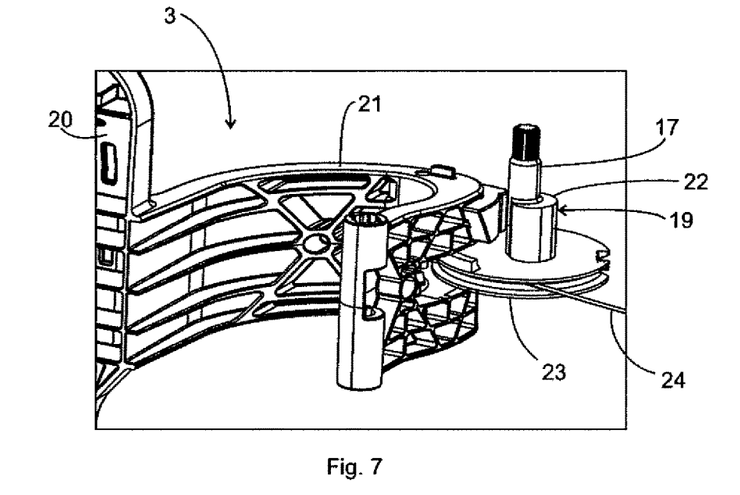
FIG. 7 is a perspective detailed view of individual components of the fuel filler flap module according to the invention.
Figure 8:
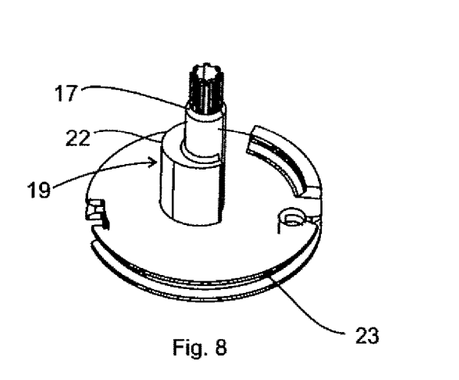
FIG. 8 is a perspective view of a disc element of the movement mechanism of the fuel filler flap module according to the invention.
Figure 9:
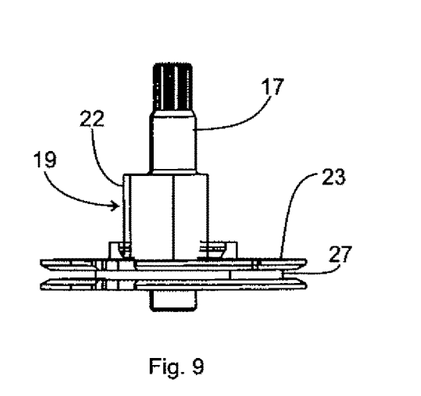
FIG. 9 is a side view of the disc element of the movement mechanism of the fuel filler flap module according to the invention.
Figure 10:
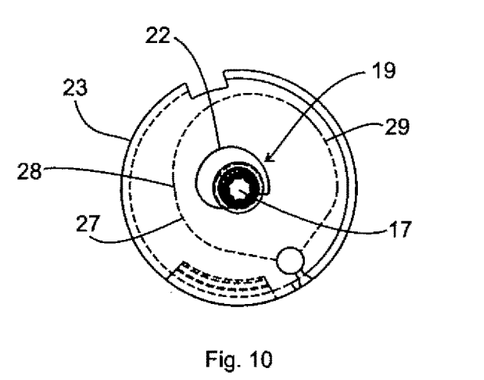
FIG. 10 is a plan view of the disc element of the movement mechanism of the fuel filler flap module according to the invention.
Figure 11:
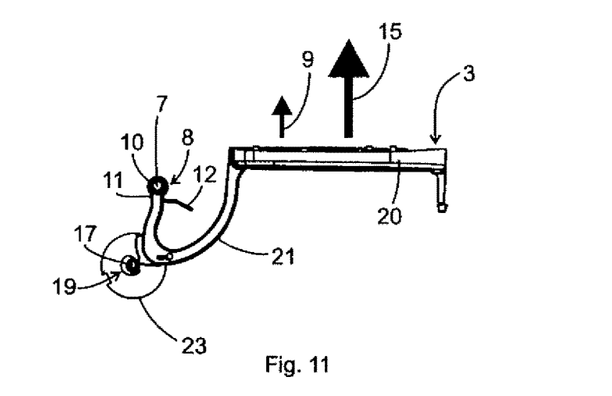
FIG. 11 is a plan view of the fuel filler flap and the movement mechanism of the fuel filler flap module according to the invention, the fuel filler flap being arranged in its closed position.

So that the fuel filler flap 3 is not catapulted from the initial deployment position in an uncontrolled manner and at too high a speed or too great an acceleration after a blockage has been overcome, a disc element 23 is formed on the output shaft 17. The disc element 23 is arranged axially offset from the eccentric contour 19 with respect to the output shaft 17. The disc element 23 serves to receive a cable means 24, which is fixed with a first end 25 to the disc element 23 and of which a second end 26 is fastened to the fuel filler flap 3. In the closed position of the fuel filler flap 3, the cable means 24 is wound onto the disc element 23, for which purpose the disc element 23 has a winding contour 27, as shown by the dashed line in FIG. 10. In FIG. 7, the cable means 24 has not yet been rolled up on the winding contour 27 of the disc element 23 and is not yet fastened to the disc element 23, either. The cable means 24 therefore protrudes laterally from a slot in the disc element 23, wherein the winding contour 27 of the disc element 23 designed for rolling up and unrolling the cable means 24 is not visible from the outside and can only be reached via the slot for the cable means 24. The cable means 24 is connected to the fuel filler flap 3 in such a way that the cable means 24 is designed to guide the movement of the fuel filler flap 3 during the movement of the fuel filler flap 3 from the initial deployment position into the open position against the deployment force 9 of the mechanical deployment element 8. It can be seen that the movement of the fuel filler flap 3 therefore takes place in a controlled manner by the motor-driven deployment means 14 via the disc element 23 and thus the cable means 24. The winding contour 27 is designed having at least two different radii 28, 29 that continuously merge into one another or is designed to be eccentric, as shown in FIG. 10. The cable means 24 then unwinds over the small radius 28 when the fuel filler flap 3 is to be moved with a high force, which is the case, for example, during the movement of the fuel filler flap 3 back into the closed position, when the peripheral edge of the fuel filler flap 3 is to be pulled into a seal. In contrast, the cable means 24 unwinds over the large radius 29 when no great force is required and the fuel filler flap 3 is pushed into the open position solely by the deployment force of the mechanical deployment element 8.

With reference to FIGS. 12 to 17, a blockage operation of the fuel filler flap module 2 according to the invention is described below, with FIGS. 12 to 16 showing detailed views of part of the movement mechanism 6 of the fuel filler flap module 3 according to the invention.

Figure 12:
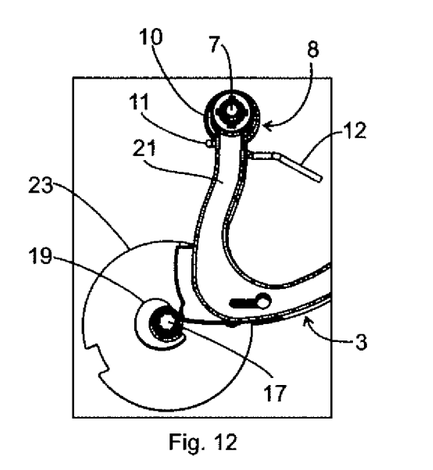
FIG. 12 is a detailed view of the movement mechanism of the fuel filler flap module according to the invention, the fuel filler flap being arranged in its closed position.

In FIG. 12, the fuel filler flap 3 is arranged in the closed position thereof, the deployment force 9 of the mechanical deployment element 8 acting in the direction of the open position acting on the fuel filler flap 3. The motor-driven deployment means 14 has a gear drive (not shown in the drawings) which has a self-locking effect, so that when the motor-driven deployment means 14 is deactivated, the fuel filler flap 3 is held in its closed position via the cable means 24 and the disc element 23 because the output shaft 17 cannot rotate due to the self-locking effect of the gear drive of the motor-driven deployment means 14. In the closed position of the fuel filler flap 3, the eccentric contour 19 is arranged at a distance from the pivoting arm 21.

Figure 13:
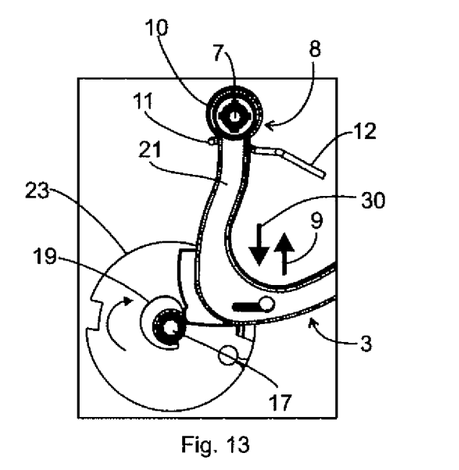
FIG. 13 is a further detailed view of the movement mechanism of the fuel filler flap module according to the invention, the fuel filler flap being arranged in its closed position and a motor-driven deployment means being put into operation.

FIG. 13 shows a position in which the fuel filler flap 3 is still arranged in its closed position due to a blockage which counteracts the deployment force 9 with a blocking force 30. The blocking force 30 can be seen to be at least as great as the deployment force 9. The fuel filler flap module 2 has received a signal to open the fuel filler flap 3 and the motor-driven deployment means 14 is in operation and has rotated the output shaft 17 clockwise (see arrow in FIG. 13), so that the cable means 24 (not shown in FIG. 13) is relaxed and in normal operation the fuel filler flap 3 would be released so that the deployment force 9 would push the fuel filler flap 3 in the direction of the open position. However, due to the effective blocking force 30, the deployment force 9 of the mechanical deployment element 8 is not sufficient to release the blockage and overcome the blocking force 30. Rather, in FIG. 13, the eccentric contour 19 of the output shaft 17 comes into contact with the pivoting arm 21 of the fuel filler flap 3 with its smallest radius, so that the motor-driven deployment means 14 is coupled in terms of movement to the fuel filler flap 3 when the eccentric contour 19 abuts on the pivoting arm 21 of the fuel filler flap 3.

Figure 14:
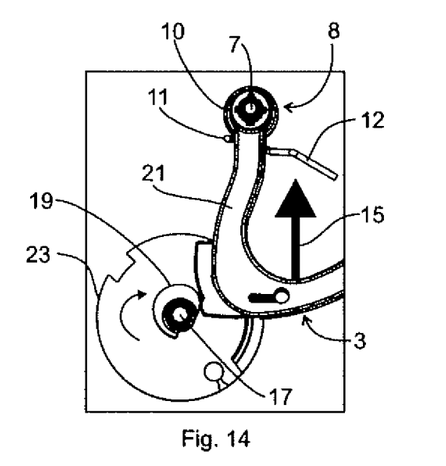
FIG. 14 is a further detailed view of the movement mechanism of the fuel filler flap module according to the invention, the fuel filler flap being arranged moved out of its closed position and being arranged pivoted by 2° about a pivot axis with respect to the closed position.

In FIG. 14, the output shaft 17 is now rotated clockwise by 2° (see arrow in FIG. 14) compared to the position shown in FIG. 13, with the increasing radius 22 of the eccentric contour 19 pushing the pivoting arm 21 into the open position with the auxiliary force 15. The auxiliary force 15, which is greater than the blocking force 30, is supposed to release the blockage.

Figure 15:
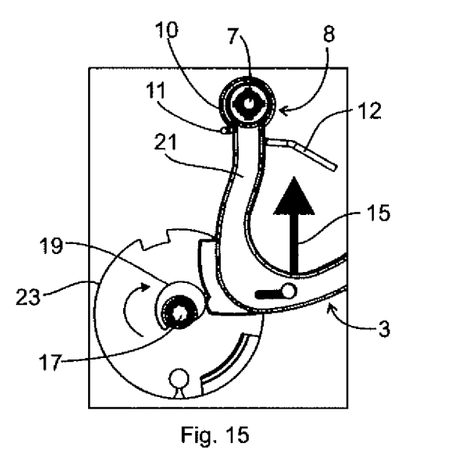
FIG. 15 is a further detailed view of the movement mechanism of the fuel filler flap module according to the invention, the fuel filler flap being moved out of its closed position and into an initial deployment position, in which the fuel filler flap is pivoted by 4° about the pivot axis with respect to the closed position.

In FIG. 15, the output shaft 17 is rotated clockwise by the motor-driven deployment means 14 by a further 2° and thus by a total of 4° in comparison to the position shown in FIG. 13 (see arrow in FIG. 15), whereby, with the increasing radius 22 of the eccentric contour 19, the auxiliary force 15 acting on the pivoting arm 21 is increased and the fuel filler flap 3 is moved out of the through opening 5, so that the blockage is lifted and the blocking force 30 is overcome. As a result, it is now possible for the mechanical deployment element 8 to force the fuel filler flap 3, which is arranged in its initial deployment position, into the open position.

Figure 16:
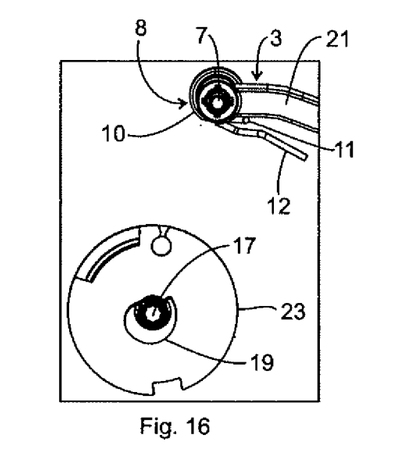
FIG. 16 is a further detailed view of the movement mechanism of the fuel filler flap module according to the invention, the fuel filler flap being arranged in its open position and being arranged pivoted by 90° about the pivot axis with respect to the closed position.
Figure 17:
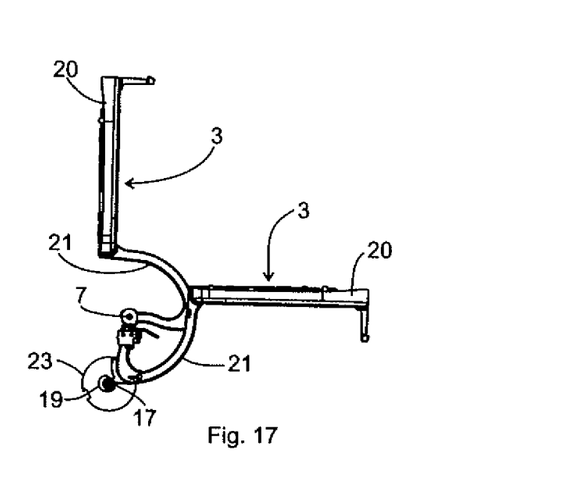
FIG. 17 is a plan view of the fuel filler flap and the movement mechanism of the fuel filler flap module according to the invention, the fuel filler flap being shown in this view both in its closed position and in its open position.

FIG. 16 shows the fuel filler flap 3, which is now arranged in its open position, the deploying of the fuel filler flap 3 from the initial deployment position into the open position taking place by the deployment force 9 of the mechanical deployment element 8. The deployment force 9 is counteracted by the cable means 24, which is unwound over the winding contour 27, since the output shaft 17 is rotated by the motor-driven deployment means 14 until the open position is reached. It is characteristic of the invention that the eccentric contour 19 is arranged at a distance from the pivoting arm 21 of the fuel filler flap 3 from the initial deployment position up to the open position, as can be seen from FIG. 16. FIG. 17 again shows the two extreme positions of the fuel filler flap 3, which is designed to be movable from the closed position, pivoted by 90° about the pivot axis 7 into the open position; alternatively, a pivoting of the fuel filler flap 3 by 110° is also conceivable.

In summary, the fuel filler flap module 2 according to the invention of a motor vehicle 1 has been described above which comprises the carrier 4, the fuel filler flap 3 pivotably mounted on the carrier 4 and designed to be movable between a closed position and an open position, and the movement mechanism 6 designed to move the fuel filler flap 3 from the closed position into the open position and back into the closed position. According to the invention, the movement mechanism 6 has the mechanical deployment element 8 which is arranged on the carrier 4 and which is designed to exert the deployment force 9 acting in the open position on the fuel filler flap 3, wherein the movement mechanism 6 has also the motor-driven deployment means 14 which is designed to push the fuel filler flap 3 with the auxiliary force 15 from the closed position up to the initial deployment position, which lies between the closed position and the open position, wherein the auxiliary force 15 is greater than the deployment force 9.

Of course, the invention described above is not limited to the described and illustrated embodiment. It can be seen that numerous modifications can be made to the embodiment depicted in the drawing, which are obvious to the person skilled in the art according to the intended application, without departing from the scope of the invention defined by the claims.

The invention claimed is:

1. A fuel filler flap module of a motor vehicle, comprising a carrier, a fuel filler flap and a movement mechanism,
   wherein the fuel filler flap is pivotably mounted on the carrier and is designed to be movable between a closed position and an open position,
   wherein the movement mechanism is configured to move the fuel filler flap from the closed position into the open position and back into the closed position, wherein the movement mechanism has a mechanical deployment element, wherein the mechanical deployment element is arranged on the carrier and is configured to exert a deployment force acting into the open position on the fuel filler flap,
   wherein the movement mechanism has a motor-driven deployment element configured to push the fuel filler flap with an auxiliary force from the closed position up to an initial deployment position, wherein the initial deployment position lies between the closed position and the open position, wherein the auxiliary force generated by the motor-driven deployment element is greater than the deployment force generated by the mechanical deployment element.

2. The fuel filler flap module according to claim 1, wherein the fuel filler flap is pivotably mounted about a pivot axis mounted on the carrier, the initial deployment position being a position moved out of the closed position in the direction of the open position, wherein in the initial deployment position the fuel filler flap is arranged pivoted by 2° to 10° about the pivot axis in the direction of the open position with respect to the closed position.

3. The fuel filler flap module according to claim 2, wherein the mechanical deployment element is a torsion spring wound around the pivot axis, wherein the torsion spring comprises a first spring arm and a second spring arm, wherein the first spring arm is supported on the fuel filler flap and the second spring arm is supported on the carrier.

4. The fuel filler flap module according to claim 2, wherein the motor-driven deployment element is drive-connected to an output shaft and drives the output shaft, wherein the motor-driven deployment element is mounted on the carrier, wherein the output shaft is mounted on the carrier at a distance from the pivot axis, wherein an eccentric contour is integrally formed on the output shaft, wherein the eccentric contour interacts with the fuel filler flap from the closed position to the initial deployment position if the deployment force of the mechanical deployment element does not push the fuel filler flap from the closed position into the initial deployment position.

5. The fuel filler flap module according to claim 4, wherein the eccentric contour is designed having a radius, wherein the radius increases with respect to the output shaft, and wherein the radius, during the rotation of the output shaft, is designed to abut on a pivoting arm of the fuel filler flap and to push against the pivoting arm and thereby to push the fuel filler flap into the initial deployment position.

6. The fuel filler flap module according to claim 4, wherein the eccentric contour is arranged at a distance from the pivoting arm of the fuel filler flap from the initial deployment position up to the open position.

7. The fuel filler flap module according to claim 4, wherein a disc element is formed on the output shaft and a cable element is provided, wherein the cable element is fixed with a first end to the disc element, and wherein a second end of the cable element is fastened to the fuel filler flap.

8. The fuel filler flap module according to claim 7, wherein the cable element is connected to the fuel filler flap in such a way that the cable element is designed to guide the movement of the fuel filler flap during the movement of the fuel filler flap from the initial deployment position into the open position against the deployment force of the mechanical deployment element.

9. The fuel filler flap module according to claim 7, wherein the disc element has a winding contour designed for rolling up and unrolling the cable element.

10. The fuel filler flap module according to claim 9, wherein the winding contour is designed having at least two different radii continuously merging into one another or is designed to be eccentric.

\* \* \* \* \*